UNITED STATES PATENT OFFICE.

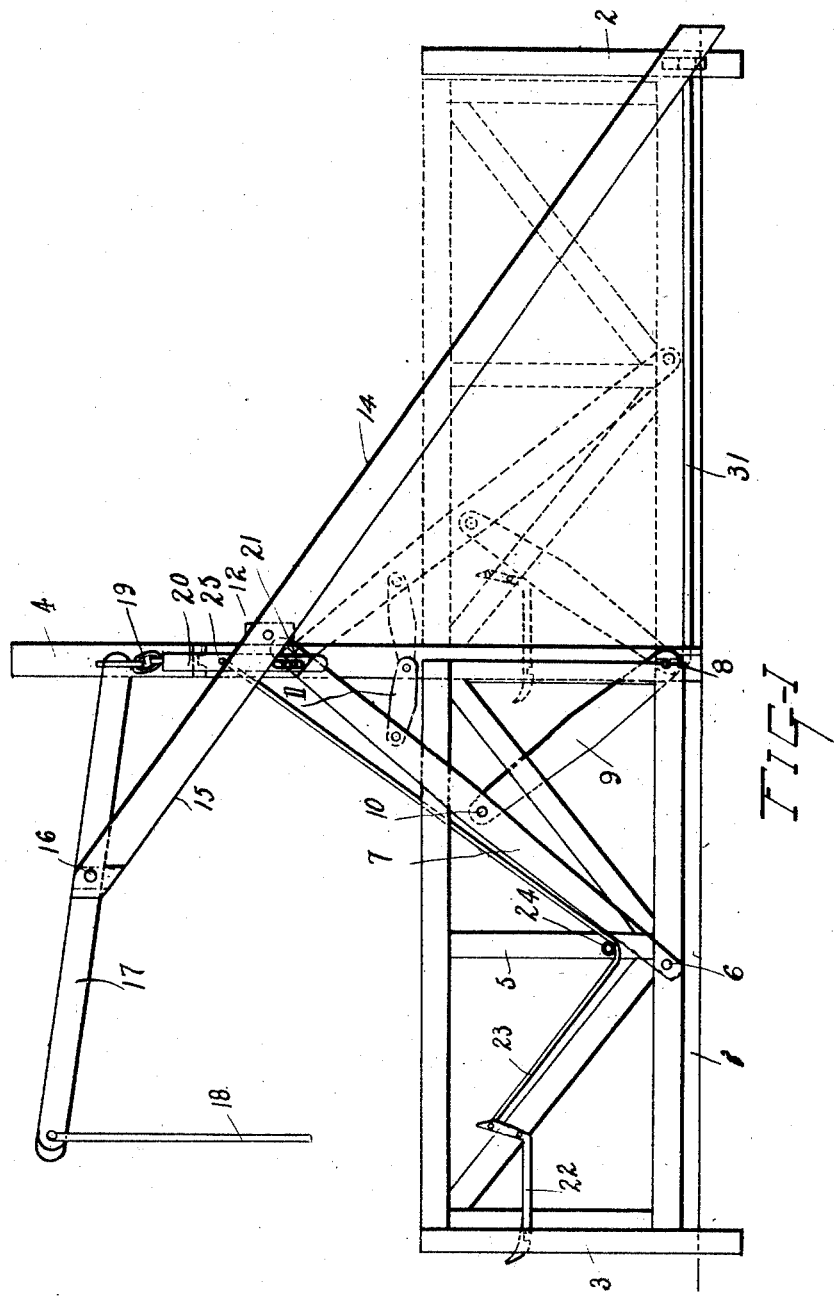

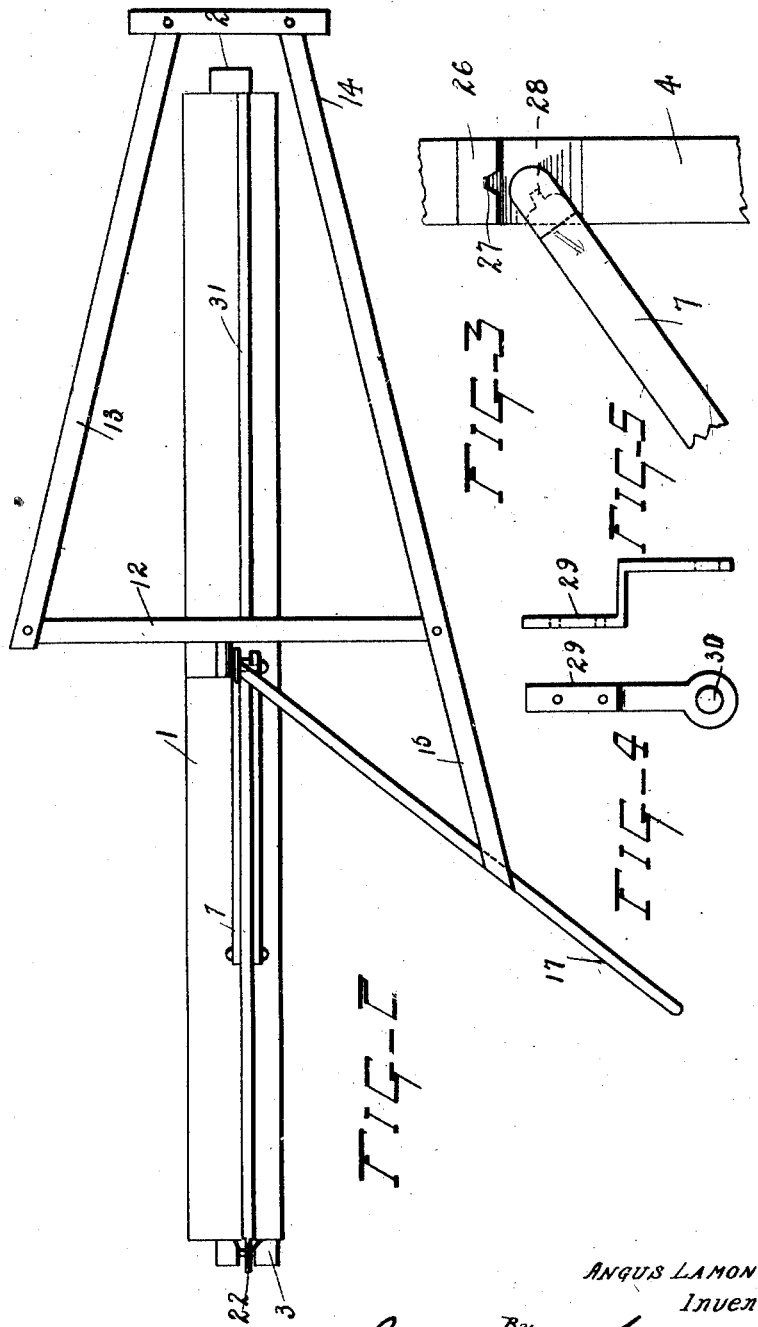

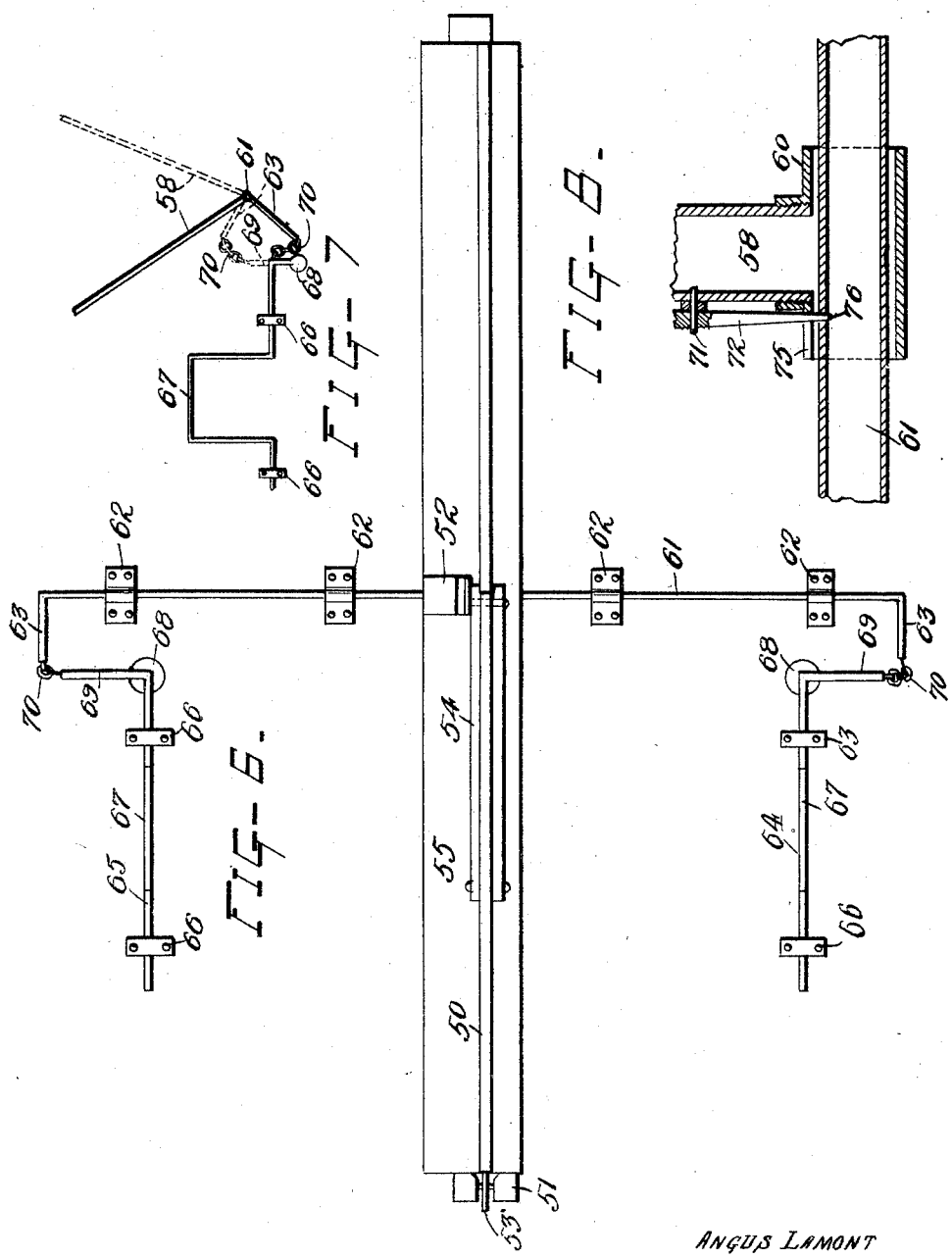

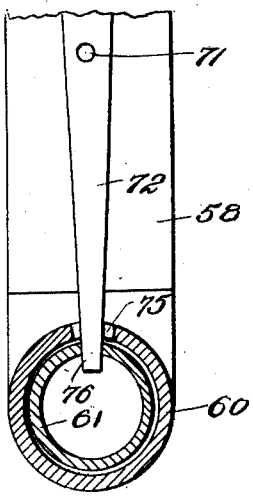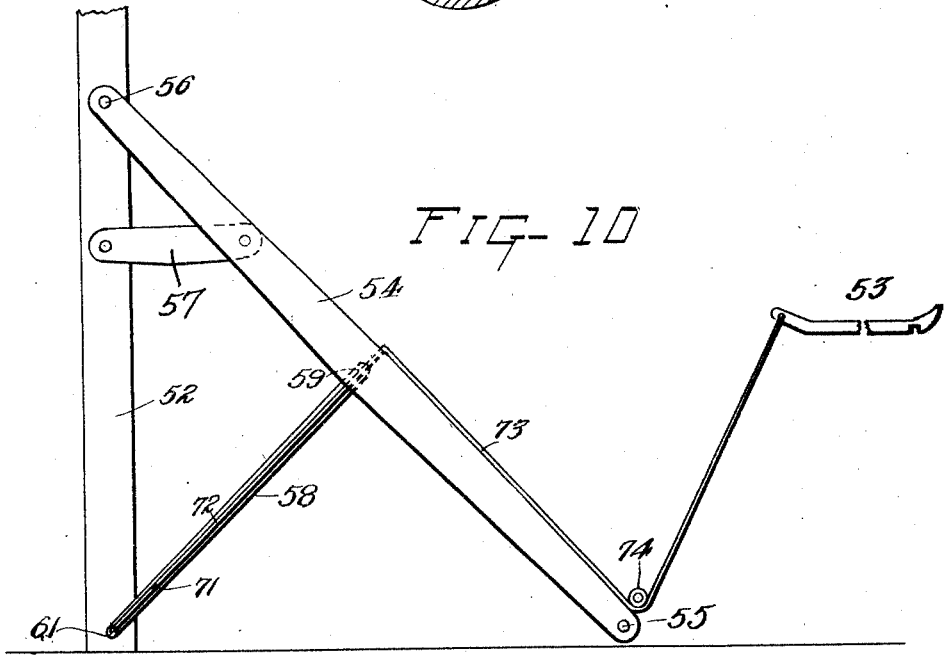

ANGUS LAMONT, OF SYDNEY, NOVA SCOTIA, CANADA, ASSIGNOR OF ONE-HALF TO RICHARD McDOUGALL, OF SYDNEY, NOVA SCOTIA, CANADA.

GATE.

1,366,086.  Specification of Letters Patent.  Patented Jan. 18, 1921.

Application filed December 9, 1916. Serial No. 135,983.

*To all whom it may concern:*

Be it known that I, ANGUS LAMONT, a subject of the King of Great Britain, residing at Sydney, Province of Nova Scotia, Canada, have invented certain new and useful Improvements in Gates; and I do hereby declare that the following is a full, clear, and exact description of the invention, such as will enable others skilled in the art to which it appertains to make and use the same.

The present invention relates to gates and an object thereof is to provide means whereby the gate may be readily opened and closed by the operator who may be seated within a vehicle adapted to pass through the gate or the same may be opened and closed by the wheels of the vehicle.

Another object of the present invention is to provide a gate of the character aforesaid which will when opening and closing the same automatically slide or latch itself and when opening and closing the gate its inner momentum will assist in causing the gate to be completely closed or opened.

With the above and other objects in view which will hereinafter appear as the description continues, the invention consists of the novel features of construction, combination and formation of parts as will be hereinafter more fully described and particularly pointed out in the appended claims.

In the accompanying drawings has been shown the simple and preferred form of the invention, it being, however, understood that no limitation is necessarily made to the precise structural details herein exhibited, but the right is hereby reserved to any changes, alterations or modifications to which recourse may be had that come within the scope of the claims without departing from the spirit of the invention or sacrificing the efficiency of the same.

In the accompanying drawings:

Figure 1 is a front elevation of the gate embodying the present invention showing the same in full lines when closed and in dotted lines when opened;

Fig. 2 is a plan view of the same;

Fig. 3 is a detail view;

Figs. 4 and 5 are detail elevations of the bearing for the gate;

Fig. 6 is a diagrammatical plan view of a means for opening and closing the gate by the wheels of a vehicle;

Figs. 7 to 9 inclusive are details thereof; and,

Fig. 10 is a fragmental side elevation of the connection between the gate and the operating means.

Referring now more particularly to the accompanying drawings wherein like and corresponding parts are designated by similar reference characters throughout the several views—

The numeral 1 indicates a platform or the ground which is in line with the fence in which the gate is included. The numerals 2 and 3 indicate the posts of the fence and the latter post 3 forms a gate post to which the gate is to be latched. The numeral 4 indicates the other gate post and the numeral 5 indicates the gate which may be of any well known or preferred construction. The gate when closed is adapted to seat itself in the position as shown in full lines in Figs. 1 and 2 for closing the gate but when the gate is opened it is swung in the position as shown in dotted lines but within alinement with the fence.

Pivotally connected as at 6 to the lower edge of the gate 5 and to one side of the center thereof is a pair of arms 7 and the upper ends of these arms are connected together. Pivotally connected as at 8 to the lower end of the post 4 is a link 9 having its opposite end pivotally connected as at 10 to the medial portion of one of said arms 7. Also pivotally connected to the post 4 and one of the arms 7 is a smaller link 11.

Connected to the upper end of the post 4 and extending in a horizontal direction is a bar 12 and the opposite ends of this bar 12 are connected by means of the diagonal bars 13 and 14 and the lower ends of these bars 13 and 14 are secured to the fence post. The upper end of the bar 14 is provided with an extension 15 and pivotally connected thereto as at 16 is a lever 17. A rope or cable 18 may be connected to one end of this lever whereby the operator seated within the vehicle adapted to travel through the passageway A may come within reach of the rope 18 and causing the lever 17 to be swung upon its pivoted connection. Connected to the inner end of the lever 17 through the flexible connection 19 is a link 20 and the lower end of this link 20 is connected to the bar 7 by means of the slot and pin connection 21. Pivotally mounted upon the gate is a latch 22 and the shorter arm of this latch 22 has connected thereto one end of a cable 23. This cable 23 extends over a roller 24 carried by the gate and its opposite end is connected as at 25 to the link 20 whereby upon pulling down on the cable 18 the lever 17 will cause the link 20 to move upwardly thereby first pulling upon the cable 23 for moving the latch member 22 whereby the gate will be unlocked and upon further pull upon the cable 18 the link 20 will be caused to raise higher until a pull is exerted upon the bar 7 through the slot and pin connection 21 for opening the gate. When a pull is exerted upon the bar 7 the gate will be caused to move until the bar 7 and the links 9 and 11 are past center and the momentum of the gate will cause the same to assume the position as shown in dotted lines of Fig. 1 where it is completely opened.

Carried by the post 4 is a block 26 having a recess 27 therein and carried by the bar 7 is a laterally projecting block having a prong 28. This prong 28 is to seat itself within the recess 27 for limiting the upward movement of the bar 7 so as to prevent the gate from being stopped when the bar 7 and the links 9 and 11 are at dead center. The inner lower edge of the gate is provided with a bracket 29 and the lower end of this bracket is provided with an aperture 30 adapted to receive the tubular bar 31. This bar 31 is connected to the posts 2 and 4 and forms a guide for the gate during its opening and closing movements.

In Figs. 6 to 10 inclusive of the drawings I have illustrated a mechanism for opening and closing a gate which is to be operated by the wheels of a vehicle so that as the vehicle approaches the roadway on which the gate is positioned the gate will be automatically opened and as the vehicle leaves the roadway on which the gate is secured the gate will be automatically closed.

The gate as herein shown is indicated by the numeral 50 being arranged between the gate posts 51 and 52 respectively and is provided with a latch 53. An arm 54 has its lower end 55 pivotally connected to the gate and this arm comprises two members which are rigidly connected at their upper ends 56. A link 57 connects the post 52 with the arm 54. When a pull is exerted upon the arm 54 it will cause the gate 50 to slide in either direction as hereinbefore described. Instead of providing the link 9 as shown in Fig. 1 of the drawings I provide a rod 58 which is pivotally connected as at 59 to the arm 54. The lower end of this rod has a T coupling 60 connected thereto which is loosely mounted upon the rod or shaft 61. This shaft 61 is journaled within the bearings 62 and extends transversely of the gate and the opposite ends of this shaft 61 are provided with right angular portions 63. Adapted to extend within the roadway are the crank shafts 64 and 65 each of which is journaled within the bearings 66 and is provided with medial U-shaped portions 70 which are adapted to normally rest in a vertical position. One end of each of these shafts 64 and 65 are provided with angular portions having formed therewith the weights 68 which normally tend to hold the U-shaped portions 67 in a vertical position. An arm 69 also extends from the shafts 64 and 65 and a chain or other flexible member 70 connects the arm 69 with the angular portions 63. Pivotally mounted as at 71 upon the rod 58 is a lever 72. The upper end of this lever 72 is connected to a cable 73 which passes over a pulley 74 carried by the gate and its opposite end is connected to the latch member 53. One end of this lever 72 extends through a slot 75 formed within one flange of the T joint 60, and its extreme inner end seats itself within the rod or shaft 61 as at 76.

From the foregoing it is obvious that as the vehicle approaches the gate the wheel of the vehicle will strike the U-shaped portion 67 of the shaft 64 causing the same to oscillate which through its connection to the shaft 61 will cause the shaft 61 to also oscillate therewith. As the shaft 61 oscillates it will cause the lever 72 to swing upon its pivot connection 71 thereby exerting a pull upon the latch 53 through the cable 73 whereby the latch member will be unlatched from the gate post 51. As the shaft 61 continues to oscillate the inner end of the lever 72 will cause the T joint 60 to be locked with the shaft 61 for causing the rod 58 to also move therewith and as the rod 58 is moved the arm 54 will be carried therewith which in turn causes the gate to slide upon its bearings for opening the same. By providing the flexible connection 70 the gate will be permitted to completely open or close itself by its own momentum after once being started without causing the shafts 64 and 65 to move therewith. As the vehicle passes through the gate the wheels thereof will strike the U-shaped portions 67 of the shaft 65 thereby again oscillating the shaft 61 in an opposite direction so as to cause the gate to be closed. In this manner it is obvious that the gate may be opened and closed automatically without the necessity of the driver of the vehicle leaving the same or exerting himself in any manner to open or close the gate.

Having thus fully described my invention, what I claim as new and desire to secure by Letters Patent is:

1. The combination of a vertically supporting post, a gate having a bar 54, pivotally connected at its lower end to one side of center of said gate, links pivotally connecting said bar to said post so that when a pull is exerted on either the bar or one of the links the gate will be caused to travel in a horizontal direction.

2. The combination with a gate and a latch therefor, of a vertical post, bars for pivotally connecting said gate to said post, a link, a slot and pin connection between said link and one of said bars, a flexible connection between the latch of the gate and said link and means whereby when a pull is exerted upon said link said latch will be caused to open and the gate subsequently moved in a horizontal direction.

3. In a device of the character described the combination of a supporting post, a gate having a bar pivotally connected at one side of its center, links pivotally connecting said bar to said post, a recessed block carried by said post, a projection carried by said bar and adapted to seat itself within said recess when said links are at dead center with their pivoted connection, and means for exerting a pull upon said bar whereby the gate will be opened and closed for the purpose set forth.

In witness whereof I have hereunto set my hand.

ANGUS LAMONT.

Witnesses:
MARY S. FREEMAN,
WM. MCINNES.